United States Patent
Andreas-Schott et al.

(10) Patent No.: US 7,947,404 B2
(45) Date of Patent: May 24, 2011

(54) THERMALLY ENHANCED INSULATOR PLATES AND FUEL CELL STACK INCORPORATING THE SAME

(75) Inventors: Benno Andreas-Schott, Pittsford, NY (US); Gerald W. Fly, Geneseo, NY (US); Anthony G Chinnici, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1256 days.

(21) Appl. No.: 11/397,753

(22) Filed: Apr. 4, 2006

(65) Prior Publication Data
US 2007/0231656 A1    Oct. 4, 2007

(51) Int. Cl.
H01M 8/02 (2006.01)
H01M 8/24 (2006.01)
B60K 1/00 (2006.01)
B60K 6/32 (2006.01)

(52) U.S. Cl. ........ 429/434; 429/460; 429/470; 180/65.1

(58) Field of Classification Search .................. 429/34, 429/38, 39, 35, 36, 37, 26, 509, 434, 456, 429/457, 460, 409, 469, 465, 450, 458, 470; 165/56; 180/65.1
See application file for complete search history.

(56) References Cited

U.S. PATENT DOCUMENTS

| | | | | |
|---|---|---|---|---|
| 2,384,463 | A  * | 9/1945 | Gunn et al. | 429/15 |
| 4,942,099 | A  * | 7/1990 | Isobe et al. | 429/35 |
| 5,131,458 | A  * | 7/1992 | Bourne et al. | 165/56 |
| 6,248,466 | B1 * | 6/2001 | Takahashi et al. | 429/38 |
| 6,265,095 | B1 * | 7/2001 | Hartvigsen et al. | 429/465 |
| 6,492,045 | B1 * | 12/2002 | Blanchet et al. | 429/456 |
| 6,855,446 | B1 * | 2/2005 | Hashimoto et al. | 429/509 |
| 2004/0137299 | A1 | 7/2004 | Mazza et al. | |
| 2004/0157099 | A1* | 8/2004 | Kato et al. | 429/26 |
| 2004/0229100 | A1 | 11/2004 | Komura et al. | |

FOREIGN PATENT DOCUMENTS
WO    WO 2004/064182 A2    7/2004

* cited by examiner

Primary Examiner — Jonathan Crepeau
Assistant Examiner — Kenneth Douyette
(74) Attorney, Agent, or Firm — Dinsmore & Shohl LLP

(57) ABSTRACT

According to the present invention, a stacked electrochemical conversion assembly is provided with an electrically and thermally insulating plate within one or both of the end unit assemblies of the stack. For example, in accordance with one embodiment of the present invention, the electrochemical conversion assembly includes at least one end unit assembly comprising an electrically conductive terminal plate and an electrically insulating plate interposed between the terminal plate and an end unit plate of the end unit assembly. The electrically insulating plate comprises an array of thermally insulating regions defined therein.

15 Claims, 7 Drawing Sheets

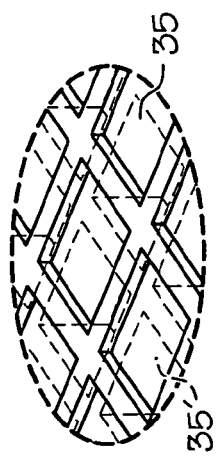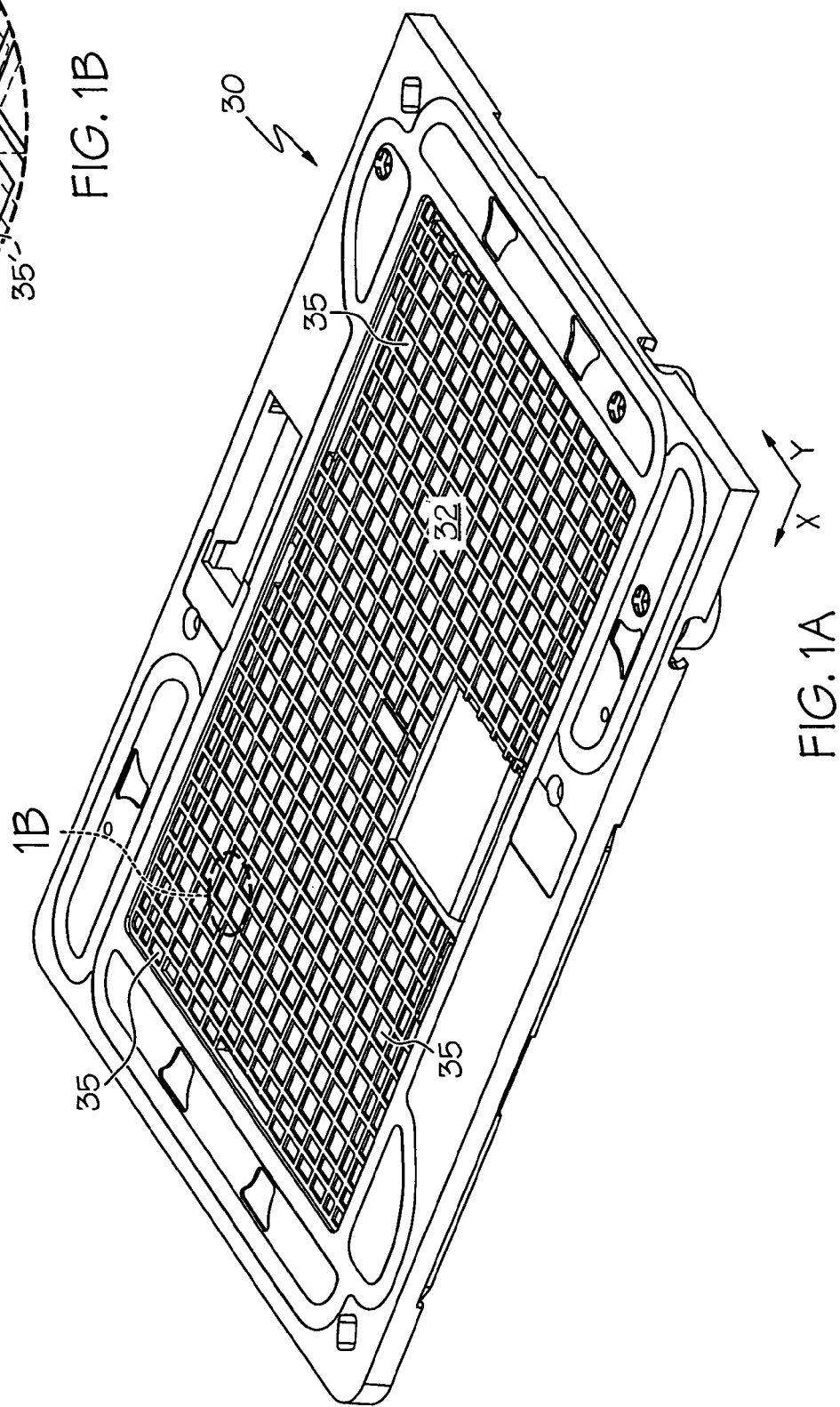

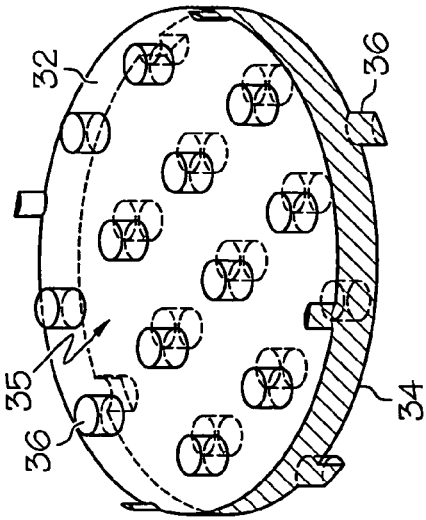
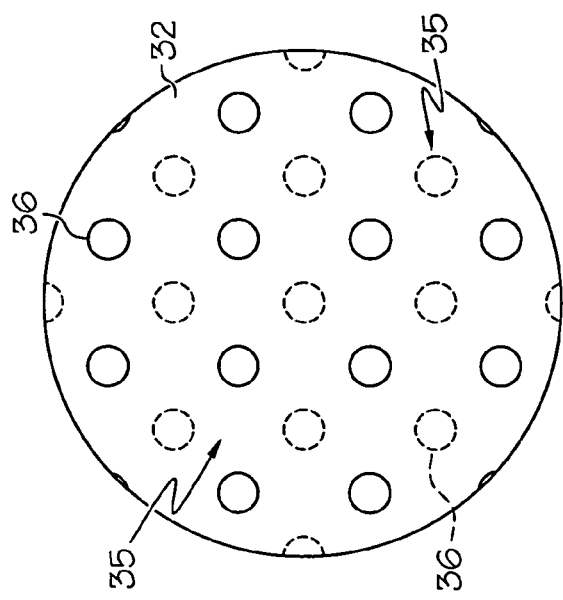
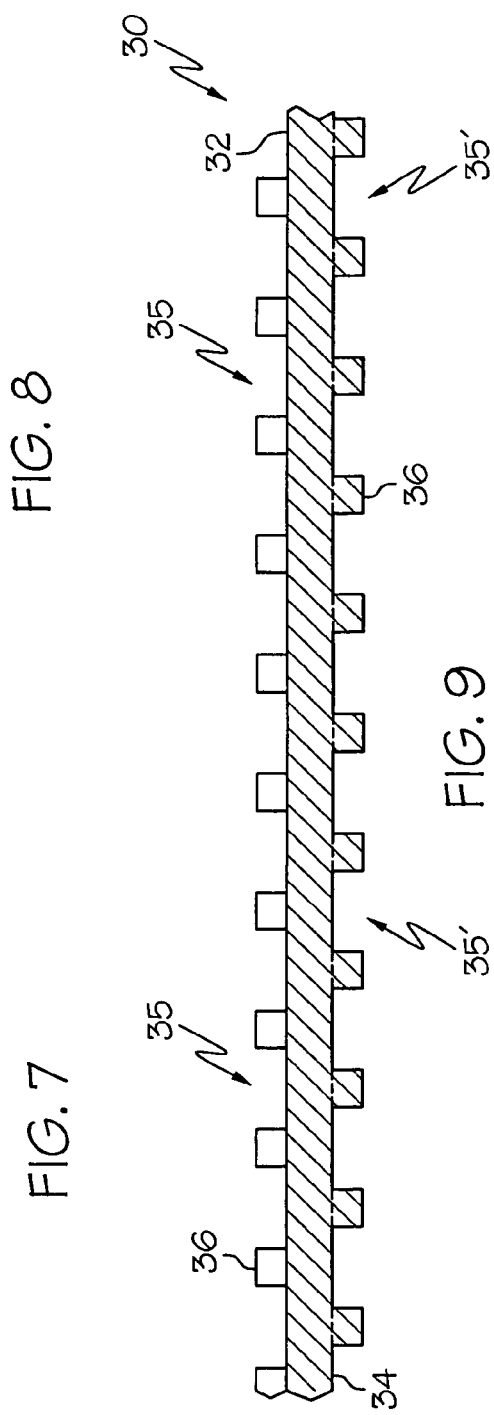

THERMALLY ENHANCED INSULATOR PLATES AND FUEL CELL STACK INCORPORATING THE SAME

BACKGROUND OF THE INVENTION

The present invention relates to electrochemical conversion cells, commonly referred to as fuel cells, which produce electrical energy by processing first and second reactants. For example, electrical energy can be generated in a fuel cell through the reduction of an oxygen-containing gas and the oxidation of a hydrogenous gas. The voltage provided by a single cell unit is typically too small for useful application so it is common to arrange a plurality of cells in a conductively coupled "stack" to increase the electrical output of the electrochemical conversion assembly.

For the purpose of describing the context of the present invention, it is noted that the general configuration and operation of fuel cells and fuel cell stacks is beyond the scope of the present invention. Rather, the present invention is directed to particular end unit configurations for fuel cell stacks and to general concepts regarding end unit design. Regarding the general configuration and operation of fuel cells and fuel cell stacks, applicants refer to the vast collection of teachings covering the manner in which fuel cell "stacks" and the various components of the stack are configured. For example, a plurality of U.S. patents and published applications relate directly to fuel cell configurations and corresponding methods of operation. More specifically, FIGS. 1 and 2 of U.S. Patent Application Pub. No. 2005/0058864, and the accompanying text, present a detailed illustration of the components of a fuel cell stack. Further, U.S. Pat. App. Pub. Nos. 2004/0137299 and 2004/0229100 also present detailed descriptions of the structure of a fuel cell stack. The respective disclosures of these publications are incorporated herein by reference, to the extent they relate to the general structure of a fuel cell stack.

BRIEF SUMMARY OF THE INVENTION

According to the present invention, a stacked electrochemical conversion assembly is provided with an electrically and thermally insulating plate within one or both of the end unit assemblies of the stack. For example, in accordance with one embodiment of the present invention, an electrochemical conversion assembly is provided comprising a plurality of electrochemical conversion cells arranged in a fuel cell stack. The fuel cell stack includes at least one end unit assembly comprising an electrically conductive terminal plate and an electrically insulating plate interposed between the terminal plate and an end unit plate of the end unit assembly. The electrically insulating plate comprises a frontside face configured to engage the terminal plate and a backside face configured to engage the end unit plate. The electrically insulating plate is configured to electrically insulate the terminal plate from the additional end unit plate and comprises an array of thermally insulating regions defined therein.

In accordance with another embodiment of the present invention, the array of thermally insulating regions comprises a frontside array arranged along the frontside face of the insulating plate and a backside array arranged along the backside face of the insulating plate. Further, the regions of the frontside array can comprise air pockets formed in the plate and can be offset from regions of the backside face, which may also comprise air pockets.

Accordingly, it is an object of the present invention to provide a stacked electrochemical conversion assembly having improved thermal operating characteristics. Other objects of the present invention will be apparent in light of the description of the invention embodied herein.

BRIEF DESCRIPTION OF THE SEVERAL VIEWS OF THE DRAWINGS

The following detailed description of specific embodiments of the present invention can be best understood when read in conjunction with the following drawings, where like structure is indicated with like reference numerals and in which:

FIGS. 1A and 1B illustrate the frontside face of a dry end electrically insulating plate according to one embodiment of the present invention;

FIG. 7 illustrates the frontside face of an electrically insulating plate with an array of thermally insulating regions according to another embodiment of the present invention.

FIG. 8 illustrates a perspective view of the electrically insulating plate of FIG. 7.

FIG. 9 illustrates an edgewise view of the electrically insulating plate of FIGS. 7 and 8.

DETAILED DESCRIPTION

As will be appreciated by those familiar with fuel cell stack construction, many fuel cell stacks are configured to define what are commonly referred to as "wet" and "dry" ends to distinguish between the "wet" end of the fuel cell stack where coolant and reactant inlet/outlet ports are positioned and the opposite "dry" end of the stack that does accommodate inlet/outlet ports. Although the concepts of the present invention are applicable to fuel cell stack construction regardless of whether a stack includes a dry or wet end, the concepts of present invention can be described with reference to the structure of a fuel cell stack that includes a wet end and a dry end. For example, referring to dry end unit assembly 10 of FIGS. 1-3, it is noted that an electrochemical conversion assembly, or fuel cell stack, according to the present invention comprises a plurality of electrochemical conversion cells arranged in a fuel cell stack. The fuel cell stack includes an end unit assembly 10 comprising an electrically conductive terminal plate 20, an electrically insulating plate 30, and a series of additional end unit plates 40 defining the dry end of the fuel cell stack. Although the specific structure and function of the various end unit plates 40 illustrated in FIG. 3 are beyond the scope of the present invention, it is noted for clarity that the end unit plates 40 are commonly referred to as push plates, base plates, end plates, etc., and generally serve to seal and secure the various components of the stack. The electrically conductive terminal plate 20 defines one of the electrical terminations of the plurality of stacked cells within fuel cell stack.

Figure 2:
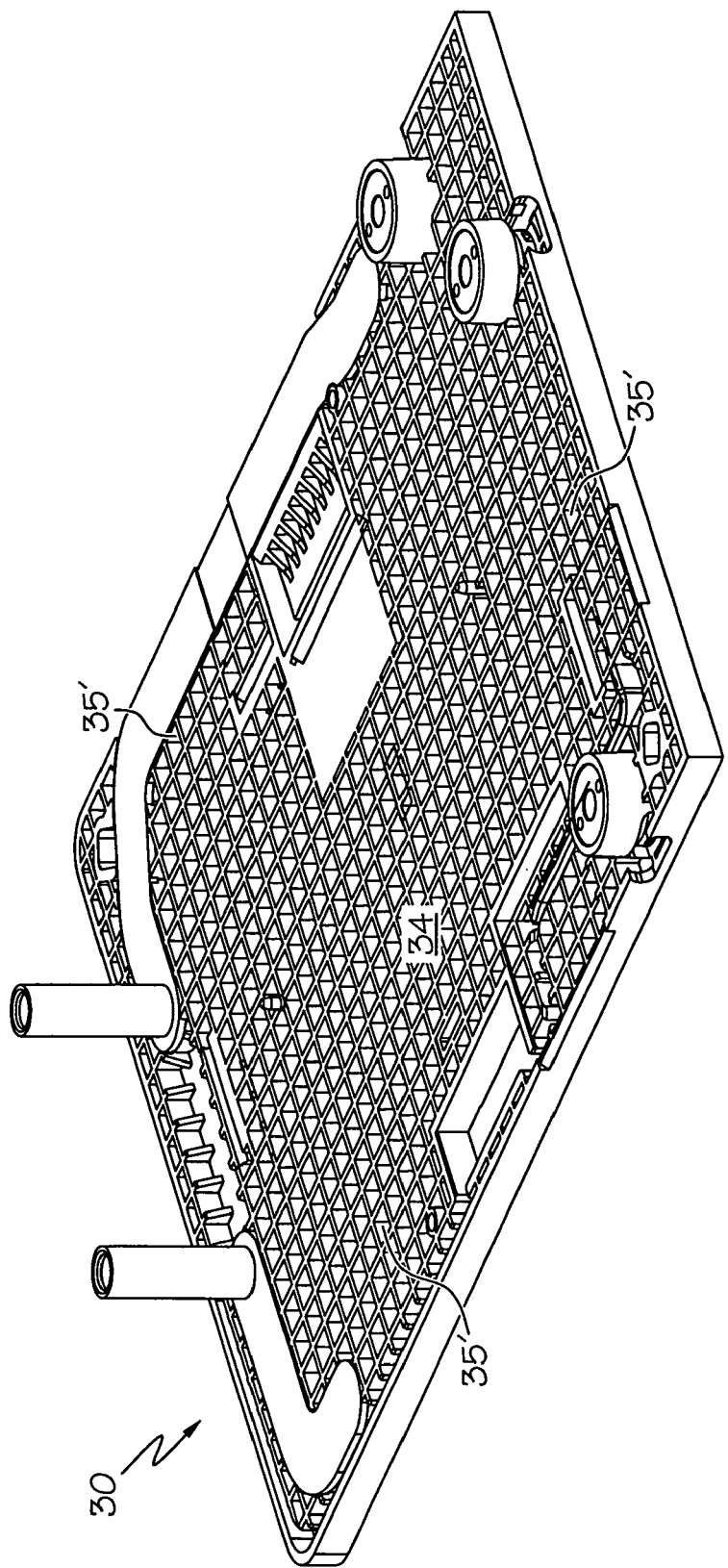
FIG. 2 illustrates the backside face of the dry end electrically insulating plate illustrated in FIGS. 1A and 1B.
Figure 3:
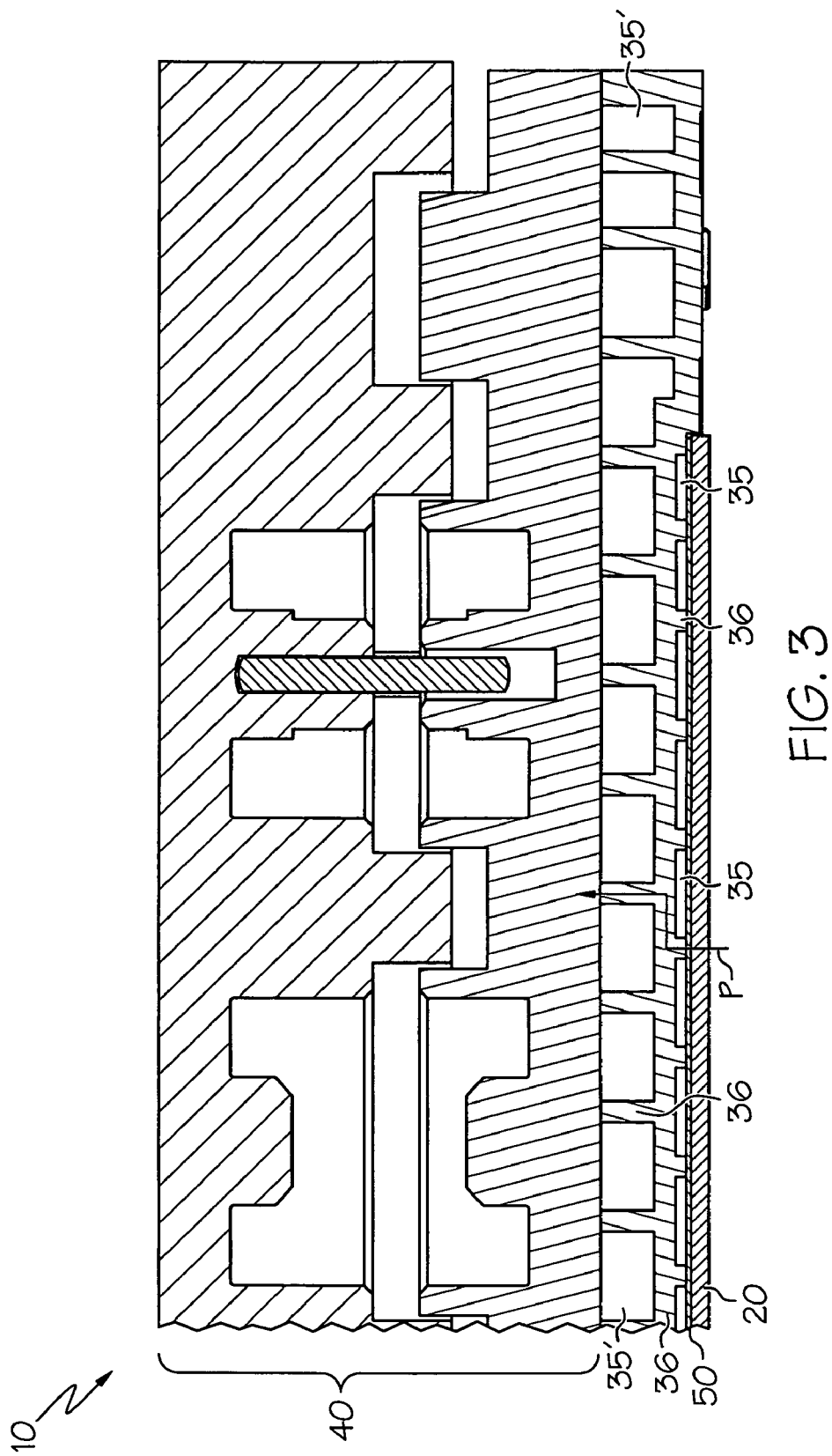
FIG. 3 illustrates a dry end electrically insulating plate according to one embodiment of the present invention interposed between a terminal plate and an end unit plate of a fuel cell stack.

The electrically insulating plate 30 is interposed between the terminal plate 20 and the adjacent end unit plate 40 of the end unit assembly 10 and comprises a frontside face 32, visible in FIG. 1A, configured to engage the terminal plate 20 and a backside face 34, visible in FIG. 2, configured to engage the end unit plate 40. A heating plate 50 or other heating element may also be interposed between the insulating plate 30 and the terminal plate 20. The electrically insulating plate 30 electrically insulates the terminal plate 20 from the end unit plate 40 and comprises respective arrays of thermally insulating regions 35, 35' defined therein so as to reduce thermal loss through the end units plates 40 of the fuel cell stack, without adding additional layers of insulating material. As such, fuel cell stacks according to the present invention can be driven to their operating temperature more rapidly than would be the case if the thermally insulating regions 35, 35' were not present and exhibit more stable thermal operating characteristics. Further, the thermal insulating characteristics of the present invention can be enjoyed without introducing additional components or plates into the end unit assembly 10 of the stack.

In the illustrated embodiment, a frontside array of thermally insulating regions 35 is arranged along the frontside face 32 and a backside array of thermally insulating regions 35' is arranged along the backside face 34. In addition, as is illustrated in FIG. 1B, thermally insulating regions 35 of the frontside face 32 are offset from thermally insulating regions 35' of the backside face 34. A suitable offset in along the x-y directions of the plane of the insulating plate 30 is illustrated in detail in FIG. 1B, where the backside thermally insulating regions 35' are illustrated in phantom (dashed lines), and in FIG. 3, where the thermally insulating regions 35, 35' of the frontside array and the backside array and the accompanying structurally rigid portions 36 of the electrically insulating plate 30 are presented in cross section to illustrate the above-noted offset relationship in detail. In this manner, the structurally rigid portions 36 of the electrically insulating plate 30 define indirect thermal conductance paths extending from the frontside face 32 to the backside face 34. This offset pattern increases the thermally conductive path length P extending from the terminal plate 20 to the end unit plates 40 of the fuel cell stack and, therefore, increases thermal insulation in the stack. It is contemplated that the majority of the indirect thermal conductance paths may be at least about 10% longer than a direct thermal conductance path extending directly from the frontside face 32 to the backside face 34, although the degree to which the thermally conductive path length P exceeds the length of a direct path across the plate 30 depends upon the geometry of the thermally insulating regions 35, 35' and the structurally rigid portions 36.

Regarding the make-up of the thermally insulating regions 35, 35' it is contemplated that the regions should be of substantially lower thermal conductivity than the structurally rigid portions 36 and other regions of the electrically insulating plate 30. For example, in the illustrated embodiment the thermally insulating regions 35, 35' merely comprise air pockets formed in the insulating plate 30. It is also contemplated that the thermally insulating regions 35, 35' may be filled with a thermally insulating material other than air.

Regarding the geometry of the plate 30, it is noted that the structurally rigid portions 36 can be configured to define the array of thermally insulating regions as an array of triangular, rectangular, circular, or other suitably shaped regions. Similarly, although the illustrated embodiment shows the structurally rigid portions 36 as including extensions projecting substantially perpendicular to the frontside and backside faces 32, 34 of the electrically insulating plate 30, it is contemplated that non-perpendicular or non-linear projections would also be suitable. The electrically insulating plate 30 can be formed from a glass, a plastic, or combinations thereof and is sufficiently rigid to distribute a compressive load applied to the end unit assembly across the terminal plate 20 without substantial deformation of the thermally insulating regions 35 or the structurally rigid portions 36.

Figure 4:
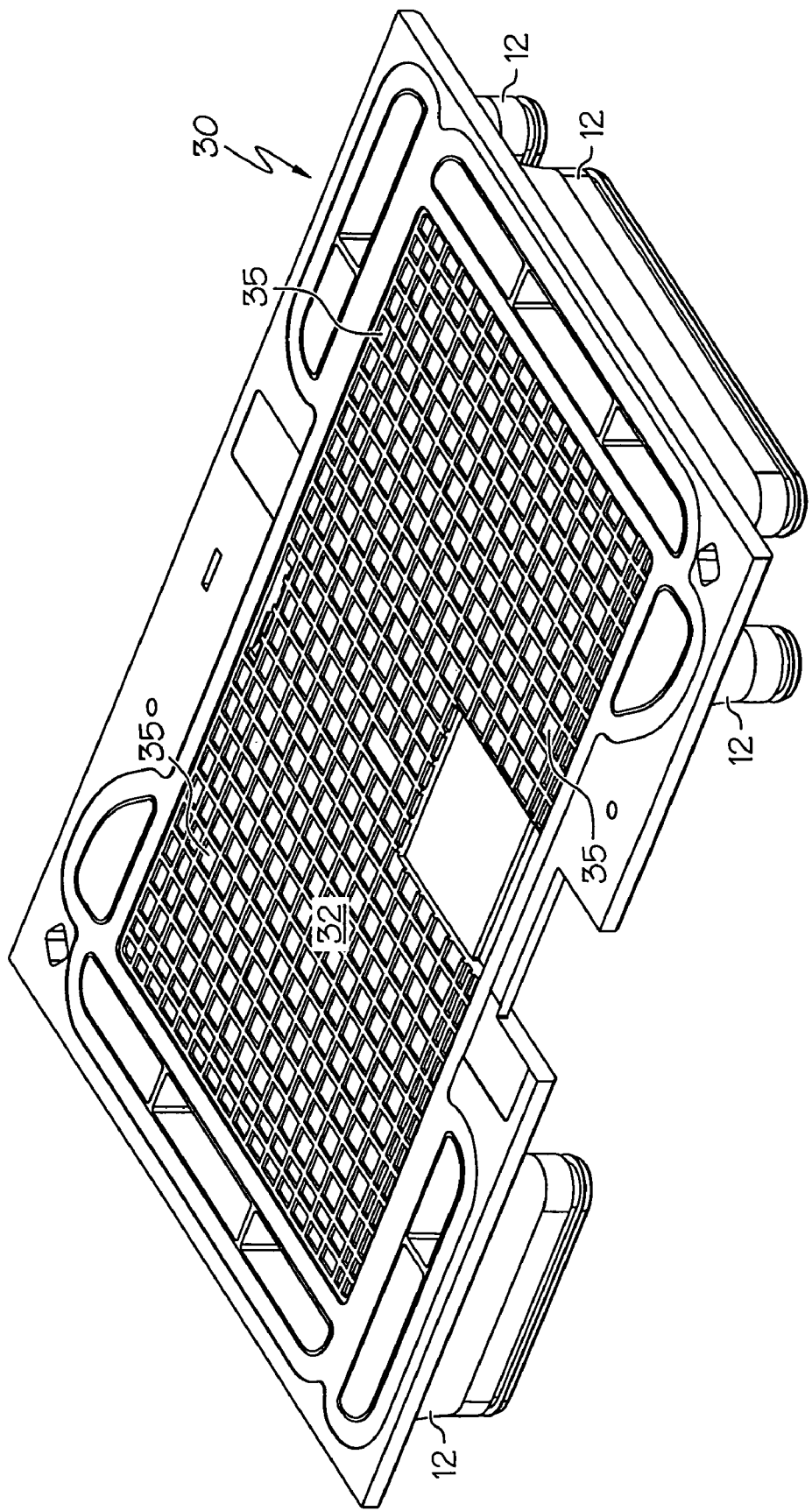
FIG. 4 illustrates the frontside face of a wet end electrically insulating plate according to one embodiment of the present invention.
Figure 5:
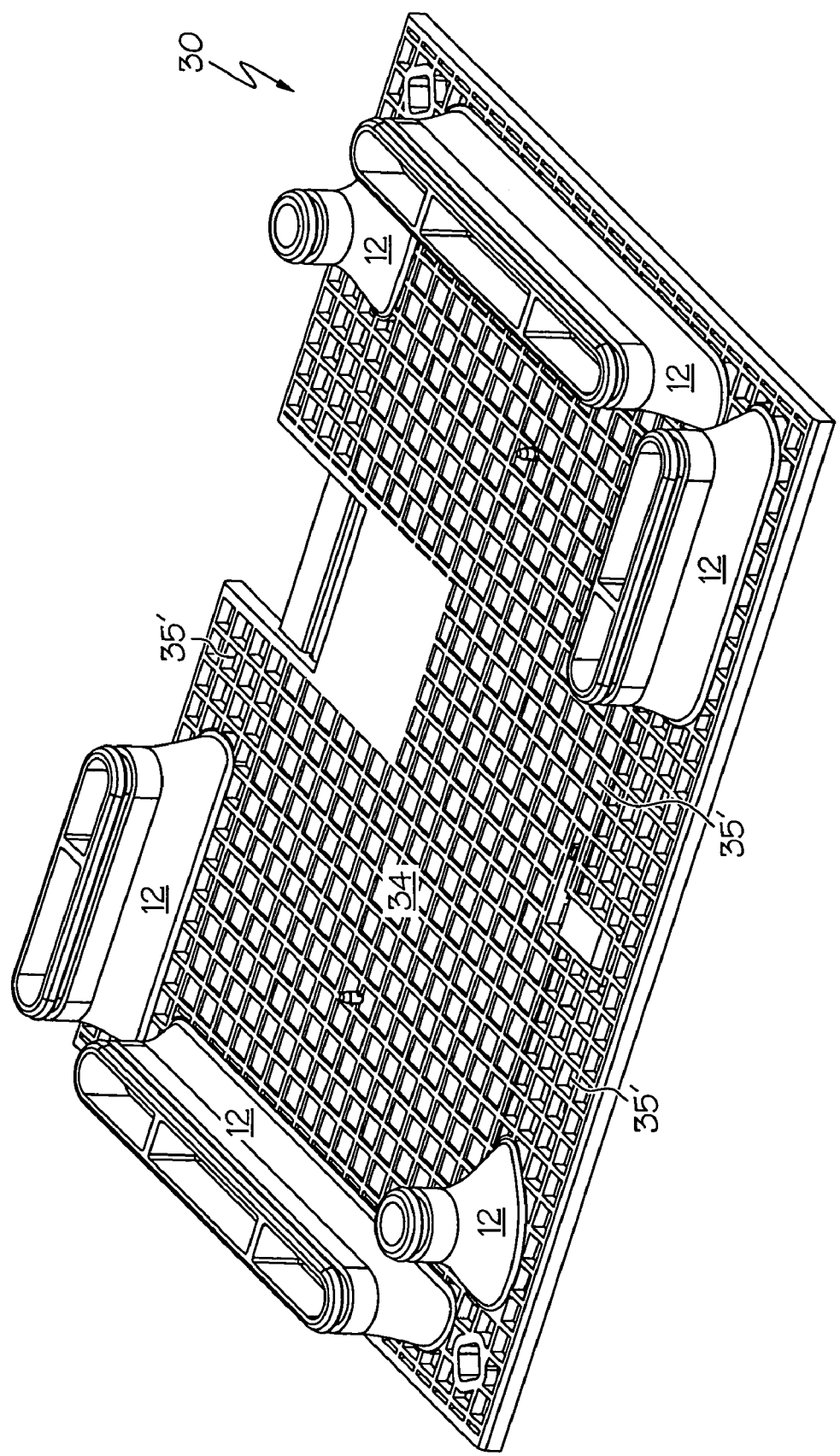
FIG. 5 illustrates the backside face of the wet end electrically insulating plate illustrated in FIG. 4.
Figure 6:
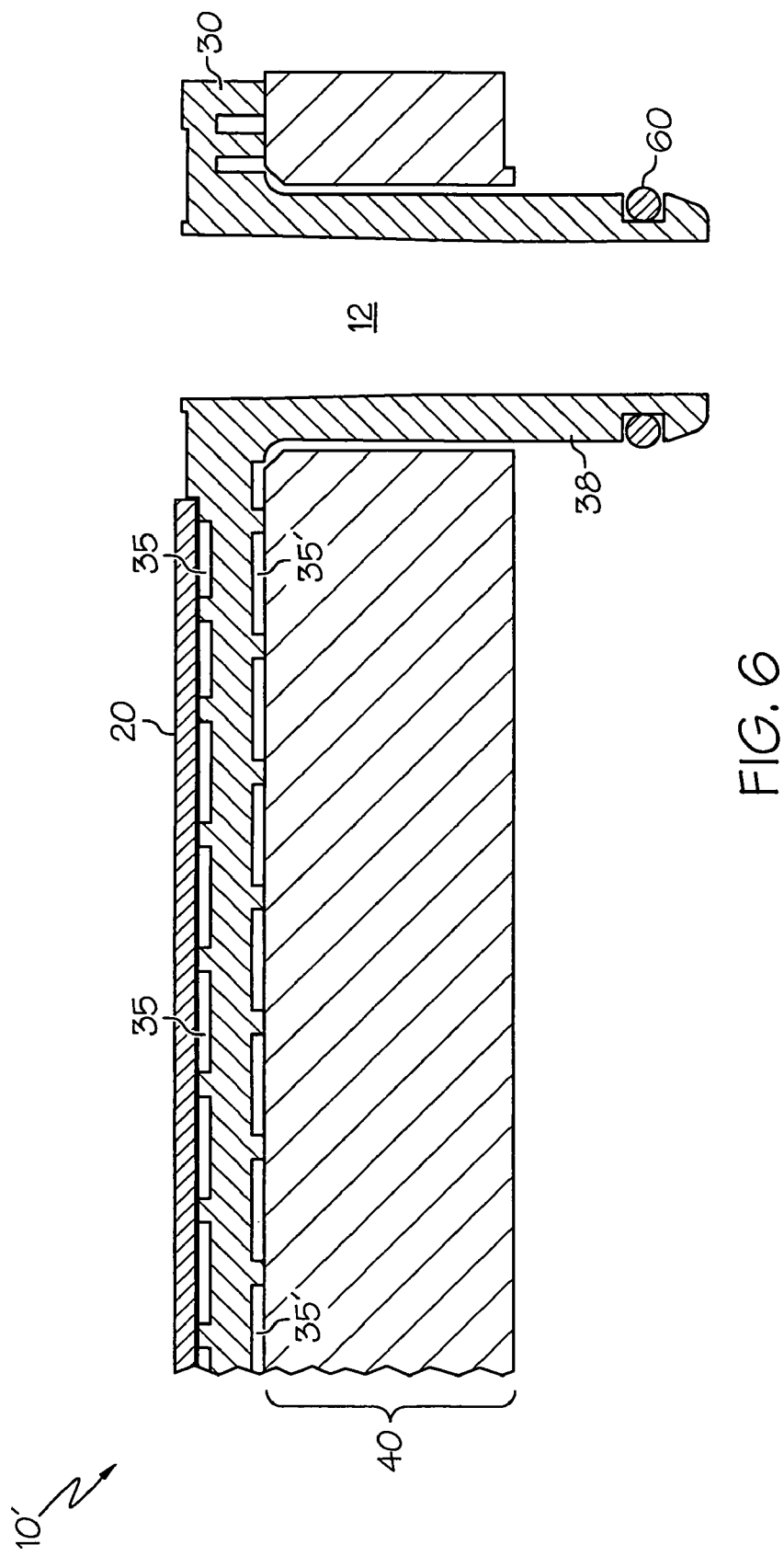
FIG. 6 illustrates a wet end electrically insulating plate according to one embodiment of the present invention interposed between a terminal plate and an end unit plate of a fuel cell stack.

Turning now to the wet end unit assembly 10' of FIGS. 4-6, where structure analogous to that illustrated in FIGS. 1-3 is designated with common reference numerals, it is noted that fuel cell stacks according to the present invention can be configured to incorporate electrically insulating plates 30 within the wet and dry end unit assemblies 10, 10' of the stack. It is further noted that the electrically insulating plate 30 utilized in a wet end unit assembly 10' may differ from that of the dry end unit assembly 10 because wet end unit assemblies commonly comprise one or more inlet or outlet ports 12 defining a coolant or reactant passage through the end unit assembly 10' to a fluid header or manifold of the fuel cell stack. Accordingly, the wet end unit assembly 10' may be configured to comprise an electrically insulating plate 30 comprising a thermally and electrically insulating sleeve 38 extending through at least a portion of the inlet/outlet port 12. The sleeve 38 can be configured with appropriate sealing means for interfacing with associated portions of the fuel cell stack (see O-ring 60) and is configured to isolate fluid moving through the inlet/outlet port 12 from portions of the wet end unit assembly 10', thermally and electrically.

An alternative embodiment of the present invention is illustrated in FIGS. 7-9, where the arrays of thermally insulating regions 35, 35' along the frontside and backside faces 32, 34 of the electrically insulating plate 30 comprise voids defined by respective arrays of posts 36 formed along the frontside and backside faces 32, 34. For the purposes of describing and defining the present invention, it is noted that the term "void" is used to refer to the thermally insulating regions 35, 35' of FIGS. 7-9, while the term "cavity" is used to refer to the thermally insulating regions 35, 35' of FIGS. 1-6 because the precise bounds of the voids in FIGS. 7-9 are less precisely defined than the bounds of the cavities in FIGS. 1-6. More specifically, the voids of FIGS. 7-9 are merely defined by the array of structurally rigid posts 36 while the cavities of FIGS. 1-6 are defined by the much more extensive structurally rigid portions 36 illustrated therein. In any event, it is contemplated that either configuration will serve the objects of the present invention.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. For example, it is contemplated that a vehicle may be configured to incorporate an electrochemical conversion assembly according to the present invention to permit the electrochemical conversion assembly to serve as a source of motive power for the vehicle. Similarly, a mobile or stationary electrical power supply unit may be configured to incorporate an electrochemical conversion assembly according to the present invention.

More specifically, although some aspects of the present invention are identified herein as preferred or particularly advantageous, it is contemplated that the present invention is not necessarily limited to these preferred aspects of the invention.

What is claimed is:

1. An electrochemical conversion assembly comprising a plurality of electrochemical conversion cells arranged in a fuel cell stack, wherein:
    said fuel cell stack includes at least one end unit assembly comprising an electrically conductive terminal plate and an electrically insulating plate interposed between said terminal plate and at least one end unit plate of said end unit assembly;
    said electrically conductive terminal plate defines an electrical termination of said plurality of stacked cells;
    said electrically insulating plate defining a plane and comprising a frontside face engaging said terminal plate and a backside face engaging said additional end unit plate;
    said electrically insulating plate electrically insulating said terminal plate from said additional end unit plate and comprising a frontside array of thermally insulating regions on said frontside face and a backside array of thermally insulating regions on said backside face;
    wherein said frontside array is defined by structurally rigid portions projecting from said plane on said frontside face and said backside array is defined by structurally rigid portions projecting from said plane on said backside face, said structurally rigid portions surrounding cavities defining regions of substantially lower thermal conductivity than remaining regions of said electrically conducting insulating plate, said structurally rigid portions on said frontside face offset from said structurally rigid portions on said backside face so that said thermally insulating regions of said frontside array are offset from thermally insulating regions of said backside face, said structurally rigid portions on said frontside face, and said structurally rigid portions on said backside face defining indirect thermal conductance paths extending from said frontside face to said backside face.

2. An electrochemical conversion assembly as claimed in claim 1 wherein said array of thermally insulating regions comprise voids arranged along either said frontside face, said backside face, or both, said voids defining regions of substantially lower thermal conductivity than remaining regions of said electrically insulating plate.

3. An electrochemical conversion assembly as claimed in claim 2 wherein said voids are defined by an array of posts formed along either said frontside face, said backside face, or both.

4. An electrochemical conversion assembly as claimed in claim 1 wherein said indirect thermal conductance paths are at least about 10% longer than a direct thermal conductance path extending directly from said frontside face to said backside face.

5. An electrochemical conversion assembly as claimed in claim 1 wherein:
    said structurally rigid portions define said array of thermally insulating regions as an array of triangular, rectangular, circular, or other geometrically-shaped regions.

6. An electrochemical conversion assembly as claimed in claim 1 wherein said structurally rigid portions project substantially perpendicular to said plane.

7. An electrochemical conversion assembly as claimed in claim 1 wherein said array of thermally insulating regions comprises an array of air pockets formed within said electrically insulating plate.

8. An electrochemical conversion assembly as claimed in claim 1 wherein:
    said fuel cell stack comprises a wet end unit assembly and a dry end unit assembly; and
    said wet end unit assembly comprises at least one inlet or outlet port defining a passage through said end unit assembly to a fluid header or manifold of said fuel cell stack.

9. An electrochemical conversion assembly as claimed in claim 8 wherein said wet end unit assembly and said dry end unit assembly both comprise an electrically insulating plate comprising one of said thermally insulating region arrays.

10. An electrochemical conversion assembly as claimed in claim 8 wherein:
    said wet end unit assembly comprise an electrically insulating plate comprising one of said thermally insulating region arrays; and
    said electrically insulating plate further defines a thermally insulating sleeve extending through at least a portion of said inlet or outlet port so as to isolate thermally fluid moving through said port from portions of said wet end unit assembly.

11. An electrochemical conversion assembly as claimed in claim 1 said electrically insulating plate is further configured to distribute a compressive load applied to said end unit assembly across said terminal plate without substantial deformation of said array of thermally insulating regions.

12. An electrochemical conversion assembly as claimed in claim 1 wherein:
    said electrically insulating plate is further configured to distribute a compressive load applied to said end unit assembly across said terminal plate without substantial deformation of said structurally rigid portions.

13. A vehicle comprising the electrochemical conversion assembly claimed in claim 1, wherein said electrochemical conversion assembly serves as a source of motive power for said vehicle.

14. A power supply comprising the electrochemical conversion assembly claimed in claim 1, wherein said electrochemical conversion assembly serves as a source of electrical power for said power supply.

15. An electrochemical conversion assembly comprising a plurality of electrochemical conversion cells arranged in a fuel cell stack, wherein:
    said fuel cell stack includes at least one end unit assembly comprising an electrically conductive terminal plate and an electrically insulating plate interposed between said terminal plate and at least one end unit plate of said end unit assembly;
    said electrically conductive terminal plate defines an electrical termination of said plurality of stacked cells;
    said electrically insulating plate defining a plane and comprising a frontside face engaging said terminal plate and a backside face engaging said additional end unit plate;

said electrically insulating plate electrically insulating said terminal plate from said additional end unit plate and comprising a frontside array of thermally insulating regions on said frontside face and a backside array of thermally insulating regions on said backside face; wherein said frontside array is defined by structurally rigid portions projecting substantially perpendicular to said plane on said frontside face and said backside array is defined by structurally rigid portions projecting substantially perpendicular to said plane on said backside face, wherein said frontside array and said backside array are defined by said structurally rigid portions surrounding cavities defining regions of substantially lower thermal conductivity than remaining regions of said electrically insulating plate, said structurally rigid portions on said front surface offset from said structurally rigid portions on said back surface so that said thermally insulating regions of said frontside array are offset from thermally insulating regions of said backside face, said structurally rigid portions on said front surface, and said structurally rigid portions on said back surface defining indirect thermal conductance paths extending from said frontside face to said backside face; and said indirect thermal conductance paths are at least about 10% longer than a direct thermal conductance path extending directly from said frontside face to said backside face.

* * * * *